US012583449B2

(12) United States Patent
Cho

(10) Patent No.: US 12,583,449 B2
(45) Date of Patent: Mar. 24, 2026

(54) DRIVER ASSISTANCE APPARATUS AND METHOD FOR MAINTAINING AND COMPENSATING BRAKING TORQUE IN ADAPTIVE CRUISE CONTROL

(71) Applicant: HL MANDO CORPORATION, Pyeongtaek-si (KR)

(72) Inventor: Hyuntae Cho, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 173 days.

(21) Appl. No.: 18/368,546

(22) Filed: Sep. 14, 2023

(65) Prior Publication Data

US 2024/0270246 A1     Aug. 15, 2024

(30) Foreign Application Priority Data

Feb. 9, 2023     (KR) ........................ 10-2023-0017391
Feb. 9, 2023     (KR) ........................ 10-2023-0017413

(51) Int. Cl.
*B60W 30/14*          (2006.01)

(52) U.S. Cl.
CPC ... *B60W 30/146* (2013.01); *B60W 2510/0657* (2013.01); *B60W 2510/1005* (2013.01); *B60W 2520/10* (2013.01); *B60W 2530/10* (2013.01); *B60W 2530/20* (2013.01); *B60W 2710/18* (2013.01); *B60W 2720/106* (2013.01)

(58) Field of Classification Search
CPC ....... B60W 30/146; B60W 2510/0657; B60W 2510/1005; B60W 2520/10; B60W 2530/10; B60W 2530/20; B60W 2710/18; B60W 2720/106; B60W 30/16
See application file for complete search history.

(56) References Cited

U.S. PATENT DOCUMENTS

| | | | | |
|---|---|---|---|---|
| 2002/0049116 | A1* | 4/2002 | Shiiba ..................... | F16H 59/66 |
| | | | | 477/97 |
| 2005/0278106 | A1* | 12/2005 | Simon .................... | B60W 10/11 |
| | | | | 701/70 |
| 2009/0187322 | A1* | 7/2009 | Yasui .................... | B60W 10/06 |
| | | | | 701/70 |
| 2013/0060440 | A1* | 3/2013 | Fukushiro ....... | B60W 30/18127 |
| | | | | 701/70 |
| 2017/0059035 | A1* | 3/2017 | Okamura ............ | F16H 61/0213 |

(Continued)

FOREIGN PATENT DOCUMENTS

| | | |
|---|---|---|
| JP | 2006-123586 A | 5/2006 |
| JP | 6095780 B2 | 3/2017 |

(Continued)

*Primary Examiner* — Sze-Hon Kong
(74) *Attorney, Agent, or Firm* — Hauptman Ham, LLP

(57)          ABSTRACT

A driver assistance apparatus includes a front sensor installed in a vehicle and having a field of sensing in front of the vehicle and a controller configured to process data obtained by the front sensor, and the controller is configured to determine whether the vehicle is in a situation in which deceleration is required in response to the processing of the data of the front sensor when adaptive cruise control (ACC) is in an activated state and maintain a braking torque required for the deceleration so that the vehicle is not pushed during braking when the vehicle is in the situation in which the deceleration is required.

12 Claims, 19 Drawing Sheets

(56) References Cited

U.S. PATENT DOCUMENTS

| | | | | |
|---|---|---|---|---|
| 2017/0267236 A1* | 9/2017 | Das | ........................ | B60W 10/04 |
| 2018/0297475 A1* | 10/2018 | Zhao | ......................... | B60L 7/18 |
| 2020/0262431 A1* | 8/2020 | Fehr | ..................... | B60W 20/15 |
| 2021/0370780 A1* | 12/2021 | Cho | .................... | B60L 15/2009 |
| 2022/0111845 A1* | 4/2022 | Kohno | ................ | G06V 20/597 |
| 2022/0250620 A1* | 8/2022 | Hu | ........................ | B60W 10/06 |
| 2023/0311876 A1* | 10/2023 | Okuda | ................. | B60W 30/16 |
| | | | | 701/70 |
| 2024/0270220 A1* | 8/2024 | Heidl | ................. | B60W 30/181 |

FOREIGN PATENT DOCUMENTS

| | | | |
|---|---|---|---|
| JP | 2021-133889 A | 9/2021 |
| KR | 10-2250754 B1 | 5/2021 |

* cited by examiner

DRIVER ASSISTANCE APPARATUS AND METHOD FOR MAINTAINING AND COMPENSATING BRAKING TORQUE IN ADAPTIVE CRUISE CONTROL

CROSS-REFERENCE TO RELATED APPLICATION

This application claims the benefit of Korean Patent Applications No. 10-2023-0017391, filed on Feb. 9, 2023, and No. 10-2023-0017413, filed on Feb. 9, 2023, in the Korean Intellectual Property Office, the disclosures of which are incorporated herein by reference.

BACKGROUND

1. Field

Embodiments of the present disclosure relate to a driver assistance apparatus, and more particularly, to a driver assistance apparatus and a driver assistance method capable of maintaining braking ability even when a transmission is shifted down in a state where an adaptive cruise control (ACC) function is activated, and preventing an acceleration shock due to a difference between an acceleration of a vehicle before activation of the ACC function and a required acceleration of the ACC when the ACC function is activated.

2. Description of the Related Art

In modern society, vehicles are the most common means of transportation, and the number of people using vehicles is ever increasing. With the development of vehicle technologies, there are advantages such as facilitating traveling over long distances, making people's lives more convenient, and so on, but in densely populated places such as Korea, problems such as serious traffic congestion due to worsening road traffic conditions often occur.

In recent years, in order to relieve a driver's burden and increase his or her convenience, studies regarding vehicles equipped with an advanced driver assist system (ADAS) that actively provides information related to a state of a vehicle, a state of the driver, and a surrounding environment have been actively in progress.

As an example of the ADAS mounted on the vehicle, there is a lane departure warning (LDW) system, a lane keeping assist (LKA) system, a high beam assist (HBA) system, an autonomous emergency braking (AEB) system, a traffic sign recognition (TSR) system, an adaptive cruise control (ACC) system, a blind spot detection (BSD) system, or the like.

The driver assist system is able to collect information about a surrounding environment and process the collected information. Further, the driver assist system may recognize an object and design a path for the vehicle to travel based on a result of processing the collected information.

However, in the driver assist system in the related art, there are problems in that, when shift-down of a transmission occurs during deceleration in the ACC is activated, a vehicle is pushed during braking, or when the ACC is activated, a driver feels a sense of difference and an acceleration shock occurs due to a difference between an acceleration by the driver's accelerator operation before the activation and a required acceleration by the ACC activation.

SUMMARY

Therefore, it is an aspect of the present disclosure to provide a driver assistance apparatus and a driver assistance method, capable of preventing vehicle pushing during braking by maintaining a braking torque even when shift-down of a transmission occurs during deceleration in a state where ACC is activated, and preventing an acceleration shock due to a difference between an acceleration of a vehicle before activation of the ACC and a required acceleration of the ACC when the ACC is activated.

Additional aspects of the disclosure will be set forth in part in the description which follows and, in part, will be obvious from the description, or may be learned by practice of the disclosure.

In accordance with one aspect of the present disclosure, a driver assistance apparatus includes a front sensor installed in a vehicle and having a field of sensing in front of the vehicle and a controller configured to process data obtained by the front sensor, and the controller is configured to determine whether the vehicle is in a situation in which deceleration is required in response to the processing of the data of the front sensor when adaptive cruise control (ACC) is in an activated state and maintain a braking torque required for the deceleration so that the vehicle is not pushed during braking when the vehicle is in the situation in which the deceleration is required.

The controller may determine whether a gear stage of a transmission of the vehicle is a predetermined gear stage or lower when the ACC is in the activated state.

The controller may check whether shift-down of the transmission has occurred when the gear stage of the transmission is the predetermined gear stage or lower.

The controller may determine whether the gear stage of the transmission of the vehicle is the predetermined gear stage or lower when a driving speed of the vehicle is a predetermined speed or lower in the state where the ACC is activated.

The controller may compensate for a decrease in the braking torque so that the braking torque is maintained when shift-down of a transmission of the vehicle occurs in the situation in which the deceleration is required.

The controller may be configured to determine an amount of change in acceleration by the shift-down of the transmission, and determine a compensation value of the braking torque based on the determined amount of change in acceleration.

The controller may be configured to determine an amount of change in acceleration by the shift-down of the transmission, and determine a compensation value of the braking torque based on the determined amount of change in acceleration, a weight of the vehicle, and a dynamic radius of a tire.

The controller may be configured to determine an amount of change in acceleration by the shift-down of the transmission, and determine a compensation value of the braking torque in proportion to the determined amount of change in acceleration, a weight of the vehicle, and a dynamic radius of a tire.

The controller may be configured to control a braking apparatus according to a final target braking torque to which the determined compensation value of the braking torque is applied.

The front sensor may include at least one of a camera, a radar, or a lidar.

In accordance with another aspect of the present disclosure, a driver assistance method includes obtaining data through a front sensor having a field of sensing in front of a vehicle, processing the data obtained from the front sensor, determining whether the vehicle is in a situation in which deceleration is required in response to the processing of the data of the front sensor when adaptive cruise control (ACC) is in an activated state, and maintaining a braking torque required for the deceleration so that the vehicle is not pushed during braking when the vehicle is in the situation in which the deceleration is required.

The driver assistance method may further include determining whether a gear stage of a transmission of the vehicle is a predetermined gear stage or lower when the ACC is in the activated state.

The driver assistance method may further include checking whether shift-down of the transmission has occurred when the gear stage of the transmission is the predetermined gear stage or lower.

The determining of whether the gear stage of the transmission of the vehicle is the predetermined gear stage or lower may include determining whether the gear stage of the transmission of the vehicle is the predetermined gear stage or lower when a driving speed of the vehicle is a predetermined speed or lower in the state where the ACC is activated.

The maintaining of the braking torque may include compensating for a decrease in the braking torque so that the braking torque is maintained when shift-down of a transmission of the vehicle occurs in the situation in which the deceleration is required.

The compensating of the decrease in the braking torque may include determining an amount of change in acceleration by the shift-down of the transmission and determining a compensation value of the braking torque based on the determined amount of change in acceleration.

The compensating of the decrease in the braking torque may include determining an amount of change in acceleration by the shift-down of the transmission and determining a compensation value of the braking torque based on the determined amount of change in acceleration, a weight of the vehicle, and a dynamic radius of a tire.

The compensating of the decrease in the braking torque may include determining an amount of change in acceleration by the shift-down of the transmission and determining a compensation value of the braking torque in proportion to the determined amount of change in acceleration, a weight of the vehicle, and a dynamic radius of a tire.

The compensating of the decrease in the braking torque may include controlling a braking apparatus according to a final target braking torque to which the determined compensation value of the braking torque is applied.

The front sensor may include at least one of a camera, a radar, or a lidar.

In accordance with still another aspect of the present disclosure, a driver assistance apparatus includes a front sensor installed in a vehicle and having a field of sensing in front of the vehicle and a controller configured to process data obtained by the front sensor, and the controller is configured to determine whether the vehicle is in a situation in which acceleration is required in response to the processing of the data of the front sensor when adaptive cruise control (ACC) is activated and set a target control value required for the acceleration so that an acceleration shock of the vehicle does not occur when the ACC is activated and control the acceleration according to the target control value when the vehicle is in the situation in which the acceleration is required.

The controller may check whether the vehicle is in a braking situation when the ACC is activated.

The controller may check whether a target vehicle driving in front of the vehicle exists when the vehicle is not in a braking situation.

4

The controller may determine whether an acceleration of the vehicle immediately before activation of the ACC is the same as a required acceleration of the ACC when no target vehicle exists.

The controller may be configured to grasp the acceleration of the vehicle immediately before activation of the ACC and set the required acceleration of the ACC to be the same as the acceleration of the vehicle immediately before activation of the ACC in the situation in which the acceleration is required.

The controller may be configured to grasp an engine torque of the vehicle immediately before activation of the ACC and set a required engine torque of the ACC to be the same as the engine torque of the vehicle immediately before activation of the ACC in the situation in which the acceleration is required.

In accordance with yet another aspect of the present disclosure, a driver assistance method includes obtaining data through a front sensor having a field of sensing in front of a vehicle, processing the data obtained from the front sensor, determining whether the vehicle is in a situation in which acceleration is required in response to the processing of the data of the front sensor when adaptive cruise control (ACC) is activated, and setting a target control value required for the acceleration so that an acceleration shock of the vehicle does not occur when the ACC is activated and controlling the acceleration according to the target control value when the vehicle is in the situation in which the acceleration is required.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
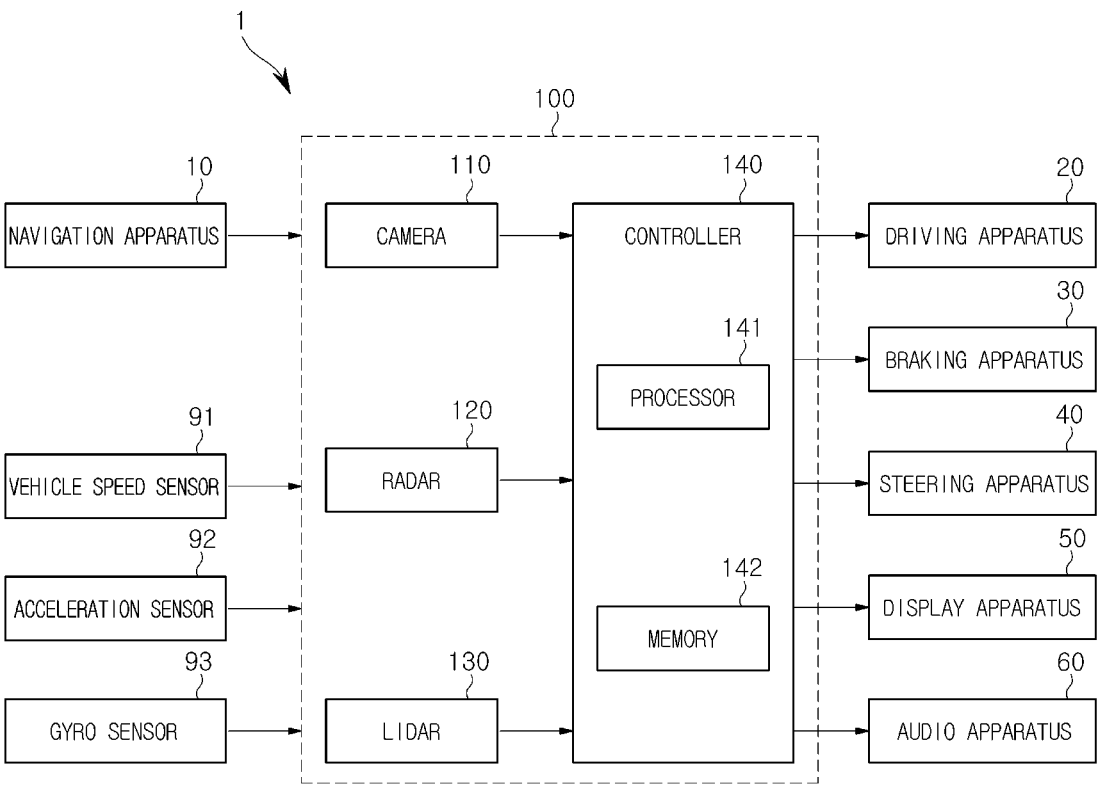
FIG. 1 illustrates configurations of a vehicle and a driver assistance apparatus in accordance with one embodiment.

Like reference numerals refer to like elements throughout the specification. Not all elements of embodiments will be described in the specification, and general information in the technical field to which the present disclosure pertains or overlapping information between the embodiments will be omitted. The terms "part," "module," "member," or "block" as used throughout the specification may be implemented in software or hardware, and a plurality of "parts," "modules," "members," or "blocks" may be implemented in a single component, or a single "part," "module," "member," or "block" may include a plurality of components.

It will be understood that when a component is referred to as being "connected" to another component throughout the specification, it can be directly or indirectly connected to the other component. When a component is indirectly connected to another component, it may be connected to the other component through a wireless communication network.

In addition, when a part "includes" or "comprises" a component, unless described to the contrary, the term "includes" or "comprises" does not indicate that the part excludes another component but instead indicates that the part may further include the other component.

In the entire specification, when a member is said to be located "on" another member, this includes not only a case where a member is in contact with another member, but also a case where another member exists between the two members.

Terms such as first, second, etc., are used to distinguish one component from another component, and the components are not limited by the above-described terms.

Unless the context clearly indicates otherwise, the singular forms include the plural forms.

In each operation, identification codes are used for convenience of description but are not intended to illustrate the order of the operations, and each operation may be implemented in an order different from the illustrated order unless explicitly stated in the context.

Hereinafter, a working principle and embodiments of the present disclosure will be described with reference to the accompanying drawings.

Figure 2:
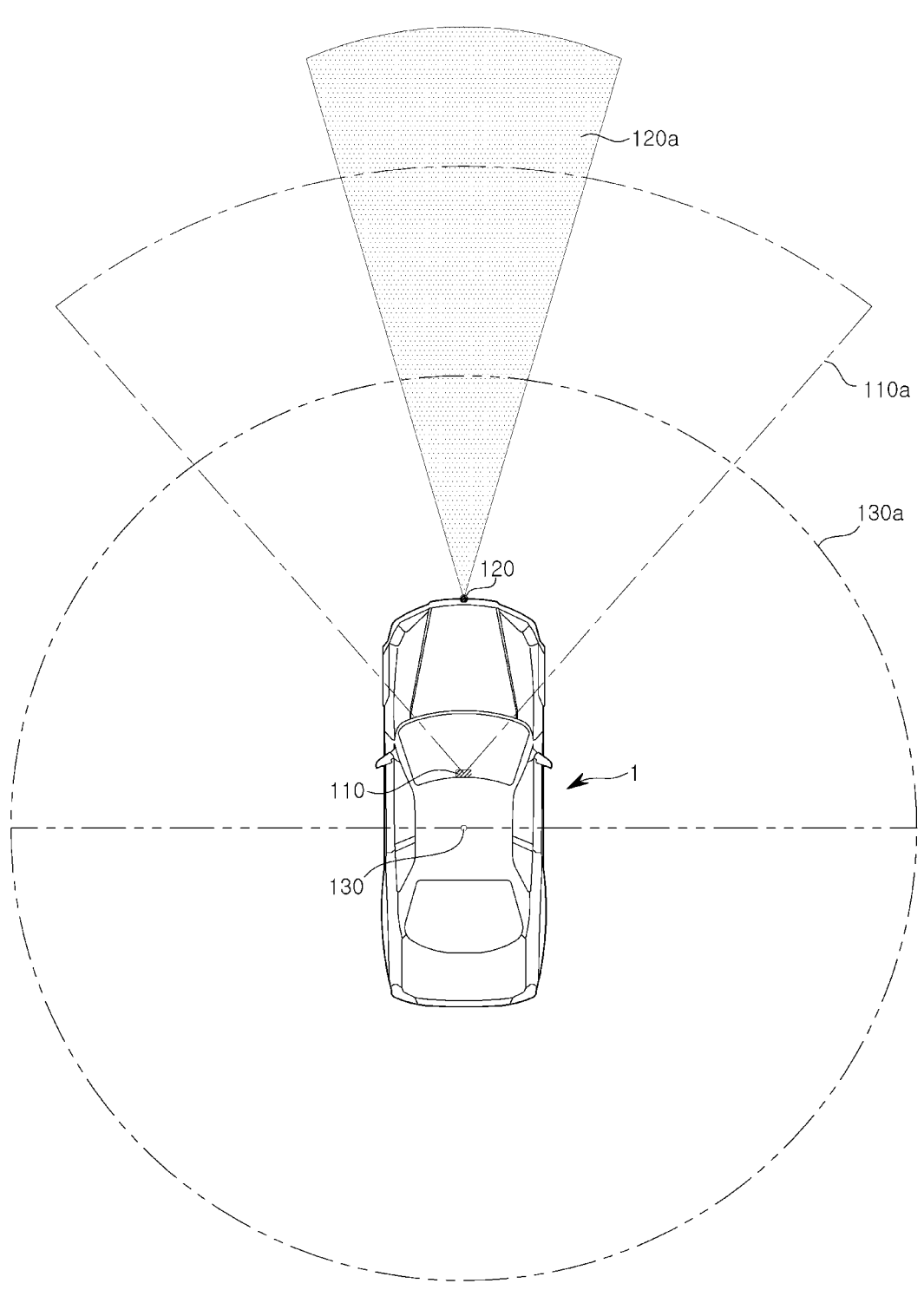
FIG. 2 illustrates fields of view of a camera, a radar, and a lidar included in the driver assistance apparatus in accordance with one embodiment.

FIG. 1 illustrates a configuration of a vehicle in accordance with one embodiment. FIG. 2 illustrates fields of view of a camera, a radar, and a lidar included in the driver assistance apparatus in accordance with one embodiment.

As illustrated in FIG. 1, a vehicle 1 may include a navigation apparatus 10, a driving apparatus 20, a braking apparatus 30, a steering apparatus 40, a display apparatus 50, an audio apparatus 60, and/or a driver assistance apparatus 100. In addition, the vehicle 1 may further include sensors 91, 92, and 93 that detect dynamics of the vehicle 1. For example, the vehicle 1 may further include a vehicle speed sensor 91 for detecting a longitudinal speed of the vehicle 1, an acceleration sensor 92 for detecting a longitudinal acceleration and a lateral acceleration of the vehicle 1, and/or a gyro sensor 93 for detecting a yaw rate, a roll rate, and a pitch rate of the vehicle 1.

These apparatuses and sensors may communicate with each other through a vehicle communication network (NT). For example, the electrical devices 10, 20, 30, 40, 50, 60, 91, 92, 93, and 100 included in the vehicle 1 may transmit and receive data via Ethernet, Media Oriented Systems Transport (MOST), FlexRay, Controller Area Network (CAN), Local Interconnect Network (LIN), or the like.

The navigation apparatus 10 may generate a route to a destination input by the driver and provide the generated route to the driver. The navigation apparatus 10 may receive a global navigation satellite system (GNSS) signal from a GNSS and identify an absolute position (coordinates) of the vehicle 1 based on the GNSS signal. The navigation apparatus 10 may generate a route to the destination based on the position (coordinates) of the destination input by the driver and the current position (coordinates) of the vehicle 1.

The navigation apparatus 10 may provide map data and position information about the vehicle 1 to the driver assistance apparatus 100. In addition, the navigation apparatus 10 may provide information on the route to the destination to the driver assistance apparatus 100. For example, the navigation apparatus 10 may provide information such as a distance to an access road for the vehicle 1 to enter a new road or a distance to an exit road for the vehicle 1 to exit from a road currently driving to the driver assistance apparatus 100.

The driving apparatus 20 may move the vehicle 1 and include, for example, an engine, an engine management system (EMS), a transmission, and a transmission control unit (TCU). The engine may generate power for driving the vehicle 1, and the engine management system may control the engine in response to a driver's willingness to accelerate through an accelerator pedal or a request from the driver assistance apparatus 100. The transmission may reduce the power generated by the engine and transfer the reduced power to the wheels, and the transmission control unit may control the transmission in response to a driver's shift command through a shift lever and/or a request from the driver assistance apparatus 100.

The braking apparatus 30 may stop the vehicle 1 and include, for example, a brake caliper and an electronic brake control module (EBCM). The brake caliper may decelerate the vehicle 1 or stop the vehicle 1 using friction with a brake disc, and the electronic brake control module may control the brake caliper in response to a driver's willingness to brake through a brake pedal and/or a request from the driver assistance apparatus 100. For example, the electronic brake control module may receive a deceleration request including a deceleration rate from the driver assistance apparatus 100 and electrically or hydraulically control the brake caliper so that the vehicle 1 decelerates depending on the requested deceleration rate.

The steering apparatus 40 may include an electronic power steering control module (EPS). The steering apparatus 40 may change a driving direction of the vehicle 1, and the electronic power steering control module may assist the operation of the steering apparatus 40 so that the driver may easily operate the steering wheel in response to a driver's willingness to steer through a steering wheel. Further, the electronic power steering control module may control the steering apparatus in response to a request from the driver assistance apparatus 100. For example, the electronic power steering control module may receive a steering request including steering torque from the driver assistance apparatus 100 and control the steering apparatus so that the vehicle 1 is steered depending on the requested steering torque.

The display apparatus 50 may include a cluster, a head-up display, a center fascia monitor, and the like, and may provide various information and entertainment to the driver through images and sounds. For example, the display apparatus 50 may provide driving information about the vehicle 1, a warning message, or the like, to the driver.

The audio apparatus 60 may include a plurality of speakers and provide various information and entertainment to the driver through sound. For example, the audio apparatus 60 may provide driving information about the vehicle 1, a warning message, or the like, to the driver.

The driver assistance apparatus 100 may communicate with the navigation apparatus 10, the plurality of sensors 91, 92, and 93, the driving apparatus 20, the braking apparatus 30, the steering apparatus 40, the display apparatus 50, and the audio apparatus 60 through the vehicle communication network. The driver assistance apparatus 100 may receive information on the route to the destination and position information about the vehicle 1 from the navigation apparatus 10, and obtain information about vehicle speed, acceleration and/or angular velocity of the vehicle 1 from the plurality of sensors 91, 92, and 93.

The driver assistance apparatus 100 may provide various functions for safety to the driver. For example, the driver assistance apparatus 100 may provide a lane departure warning (LDW) function, a lane keeping assist (LKA) function, a high beam assist (HBA) function, an autonomous emergency braking (AEB) function, a traffic sign recognition (TSR) function, an adaptive cruise control (ACC) function, a blind spot detection (BSD) function, or the like.

The driver assistance apparatus 100 may include a camera 110, a radar 120, a lidar 130, and a controller 140. The driver assistance apparatus 100 is not limited to that illustrated in FIG. 1. For example, in the driver assistance apparatus 100 illustrated in FIG. 1, at least one sensing device among the camera 110, the radar 120, and the lidar 130 may be omitted or various sensing devices capable of detecting surrounding objects of the vehicle 1 may be added. The front sensor capable of detecting a region in front of the vehicle may include the aforementioned camera 110, radar 120, and lidar 130.

The camera 110, the radar 120, the lidar 130, and the controller 140 may be provided separately from each other. For example, the controller 140 may be installed in a housing separated from a housing of the camera 110, a housing of the radar 120, and a housing of the lidar 130. The controller 140 may exchange data with the camera 110, the radar 120, or the lidar 130 through a wide-bandwidth network.

In addition, at least some of the camera 110, the radar 120, the lidar 130, and the controller 140 may be provided in an integrated form. For example, the camera 110 and the controller 140 may be provided in one housing, the radar 120 and the controller 140 may be provided in one housing, or the lidar 130 and the controller 140 may be provided in one housing.

The camera 110, the radar 120, the lidar 130, and the controller 140 may be provided with domain control units that are separated from each other.

The camera 110 may photograph surroundings of the vehicle 1 and obtain image data of the surroundings of the vehicle 1. For example, the camera 110 may be installed on a front windshield of the vehicle 1 as illustrated in FIG. 2 and may have a field of view 110a facing the front of the vehicle 1.

The camera 110 may include a plurality of lenses and an image sensor. The image sensor may include a plurality of photodiodes that convert light into electrical signals, and the plurality of photodiodes may be arranged in a two-dimensional matrix.

The image data may include information on other vehicles, pedestrians, or cyclists, or lane lines (markers distinguishing lanes) positioned around the vehicle 1.

The driver assistance apparatus 100 may include an image processor that processes the image data of the camera 110, and the image processor may be provided integrally with the camera 110 or integrally with the controller 140, for example.

The image processor may obtain the image data from the image sensor of the camera 110 and detect and identify objects around the vehicle 1 based on processing of the image data. For example, the image processor may use image processing to identify whether an object around the vehicle 1 is another vehicle, a pedestrian, a cyclist, or the like.

The image processor may transfer information about the identified object around the vehicle 1 to the controller 140.

The radar 120 may transmit transmission radio waves toward the surroundings of the vehicle 1 and detect objects around the vehicle 1 based on reflected radio waves reflected from the surrounding objects. For example, the radar 120 may be installed on a grille or bumper of the vehicle 1 as illustrated in FIG. 2 and have a field of sensing 120a facing the front of the vehicle 1.

The radar 120 may include a transmission antenna (or a transmission antenna array) for radiating transmission radio waves toward the surroundings of the vehicle 1 and a reception antenna (or a reception antenna array) for receiving reflected radio waves reflected from an object.

The radar 120 may obtain radar data from the transmission radio waves transmitted by the transmission antenna and reflected radio waves received by the reception antenna. The radar data may include position information (e.g., distance information) and/or speed information about objects positioned in front of the vehicle 1.

The driver assistance apparatus 100 may include a signal processor that processes the radar data of the radar 120, and the signal processor may be provided integrally with the radar 120 or integrally with the controller 140, for example. The signal processor may obtain the radar data from the reception antenna of the radar 120 and generate data on motion of an object by clustering reflection points of reflected signals. The signal processor may obtain a distance to the object based on, for example, a time difference between a transmission time of a transmission radio wave and a reception time of a reflected radio wave, and obtain speed of the object based on a difference between a frequency of the transmission radio wave and a frequency of the reflected radio wave.

The signal processor may transfer data on motion of the object around the vehicle 1 obtained from the radar data to the controller 140.

The lidar 130 may transmit light (e.g., infrared rays) toward the surroundings of the vehicle 1 and detect a surrounding object around the vehicle 1 based on reflected light reflected from the surrounding object. For example, the lidar 130 may be installed on a roof of the vehicle 1 as illustrated in FIG. 2 and have a field of view 130a in all directions around the vehicle 1.

The lidar 130 may include a light source (e.g., a light emitting diode, a light emitting diode array, a laser diode, or a laser diode array) emitting light (e.g., infrared rays), and an optical sensor (e.g., a photodiode or a photodiode array) that receives light (e.g., infrared rays). In addition, the lidar 130 may further include a driving apparatus for rotating the light source and/or the optical sensor as needed.

The lidar 130 may emit light through the light source and receive light reflected from the object through the light sensor while the light source and/or the light sensor rotates, thereby obtaining lidar data.

The lidar data may include relative positions (distances to and/or directions of surrounding objects) and/or relative speeds of the surrounding objects of the vehicle 1.

The driver assistance apparatus 100 may include a signal processor capable of processing the lidar data of the lidar 130, and the signal processor may be provided integrally with the lidar 130 or integrally with the controller 140, for example. The signal processor may generate data on motion of an object by clustering reflection points by reflected light. The signal processor may obtain a distance to an object based on, for example, a time difference between a light transmission time and a light reception time. In addition, the signal processor may obtain a direction (or angle) of the object with respect to a driving direction of the vehicle 1 based on a direction in which the light source emits light when the optical sensor receives the reflected light.

The signal processor may transfer data on motion of the object around the vehicle 1 obtained from the lidar data to the controller 140.

The controller 140 may be electrically connected to the camera 110, the radar 120 and/or the lidar 130. In addition, the controller 140 may be connected to the navigation apparatus 10, the driving apparatus 20, the braking apparatus 30, the steering apparatus 40, the display apparatus 50, the audio apparatus 60, and/or the plurality of sensors 91, 92, and 93 through the vehicle communication network NT.

The controller 140 may process the image data of the camera 110, the radar data of the radar 120, and/or the lidar data of the lidar 130 and provide control signals to the driving apparatus 20, the braking apparatus 30, and/or the steering apparatus 40.

The controller 140 may include a processor 141 and a memory 142.

The memory 142 may store programs and/or data for processing the image data, the radar data, and/or the lidar data. Further, the memory 142 may store programs and/or data for generating driving/braking/steering signals.

The memory 142 may temporarily store the image data received from the camera 110, the radar data received from the radar 120, and/or the lidar data received from the lidar 130, and temporarily store processing results of the image data, the radar data, and/or the lidar data by the processor 141.

Further, the memory 142 may include a high definition map (HD Map). Unlike general maps, the high definition map may include detailed information about surfaces of roads or intersections such as lane lines, traffic lights, intersections, and road signs. In particular, in the high definition map, landmarks (e.g., lane lines, traffic lights, intersections, and road signs) that a vehicle encounters while driving are implemented in 3D.

The memory 142 may include not only volatile memories such as a static random-access memory (S-RAM) and a dynamic random-access memory (D-RAM), but also non-volatile memories such as a flash memory, a read only memory (ROM), and an erasable programmable read only memory (EPROM).

The processor 141 may process the image data of the camera 110, the radar data of the radar 120, and/or the lidar data of the lidar 130. For example, the processor 141 may fuse the image data, the radar data, and/or the lidar data and output fusion data.

The processor 141 may generate a driving signal, a braking signal, and/or a steering signal for controlling the driving apparatus 20, the braking apparatus 30, and/or the steering apparatus 40, respectively, based on processing the fusion data. For example, the processor 141 may predict a collision with an object around the vehicle 1 using the fusion data and control the driving apparatus 20, the braking apparatus 30, and/or the steering apparatus 40 to steer or brake the vehicle 1 accordingly.

The processor 141 may include the image processor that processes the image data of the camera 110, the signal processor that processes the radar data of the radar 120 and/or the lidar data of the lidar 130, or a micro control unit (MCU) that generates driving/braking/steering signals.

As described above, the controller 140 may provide the driving signal, the braking signal, or the steering signal based on the image data of the camera 110, the radar data of the radar 120, or the lidar data of the lidar 130.

Hereinafter, specific operations of the driver assistance apparatus 100 will be described in more detail.

Figure 3:
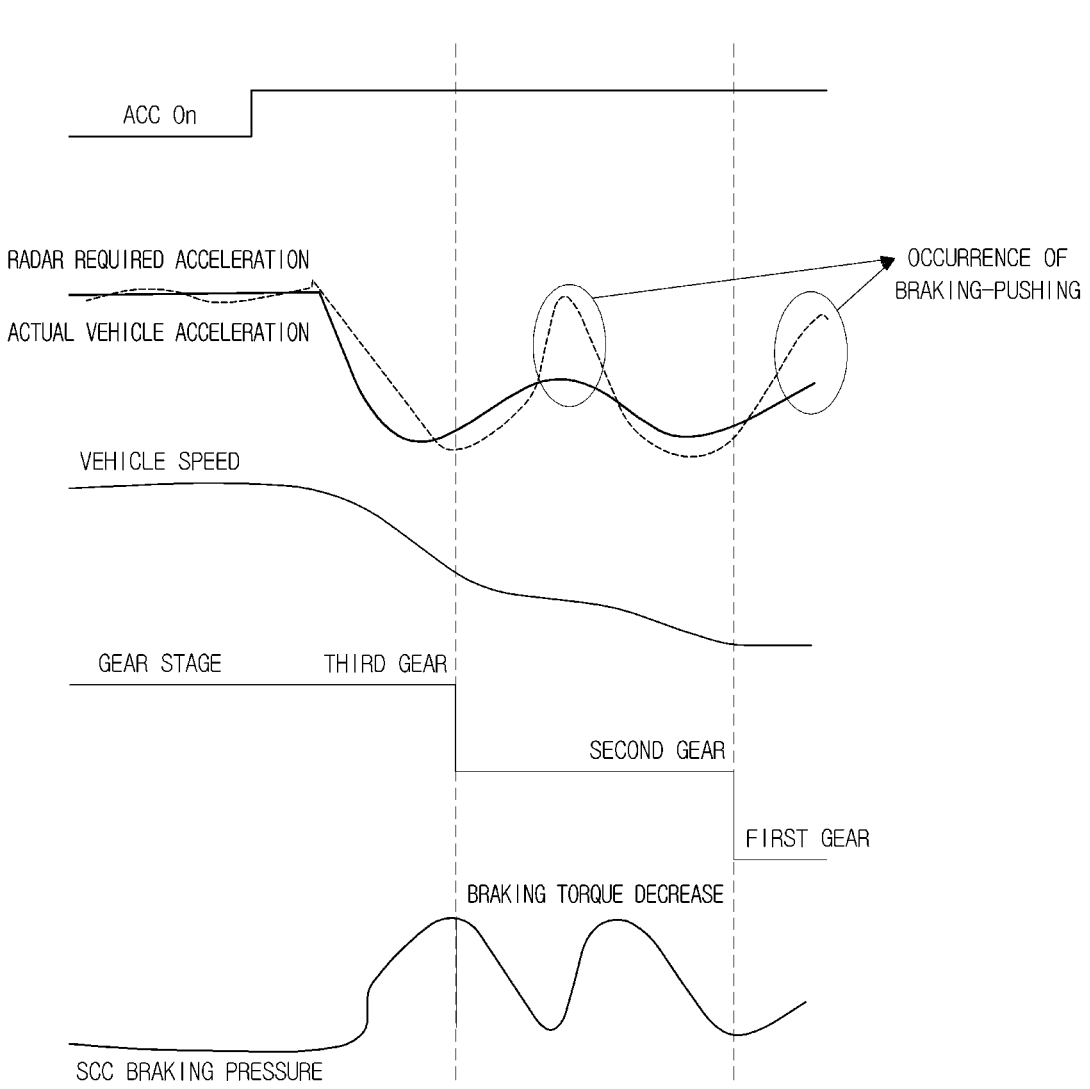
FIG. 3 is a graph showing that vehicle pushing occurs due to a decrease in braking torque.
Figure 4:
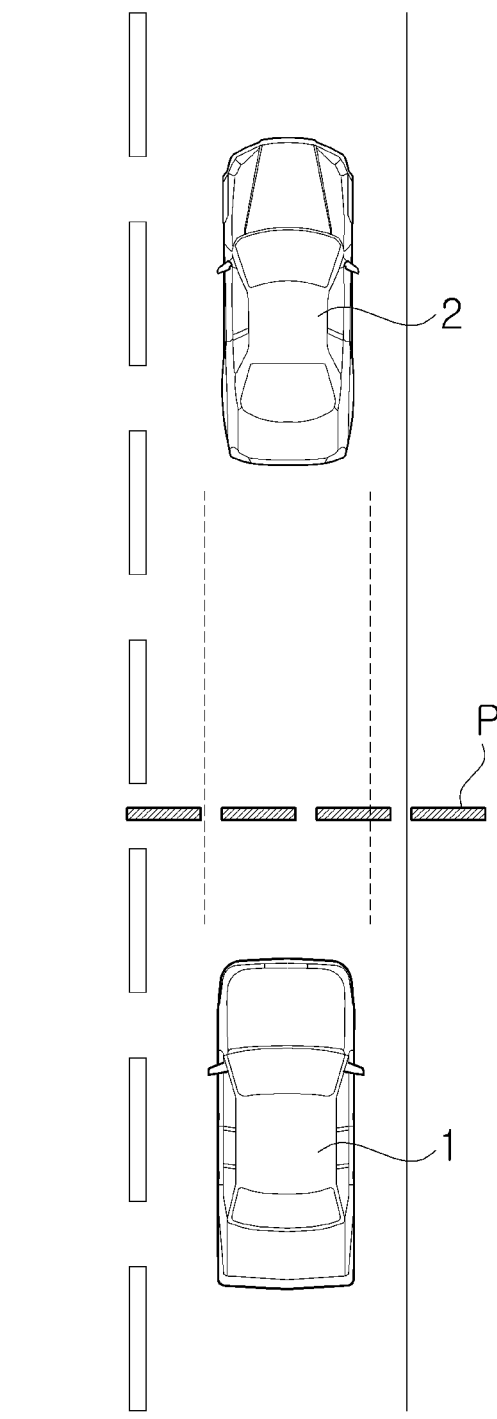
FIG. 4 illustrates a position where a vehicle is predicted to be positioned during braking for deceleration of a vehicle.
Figure 5:
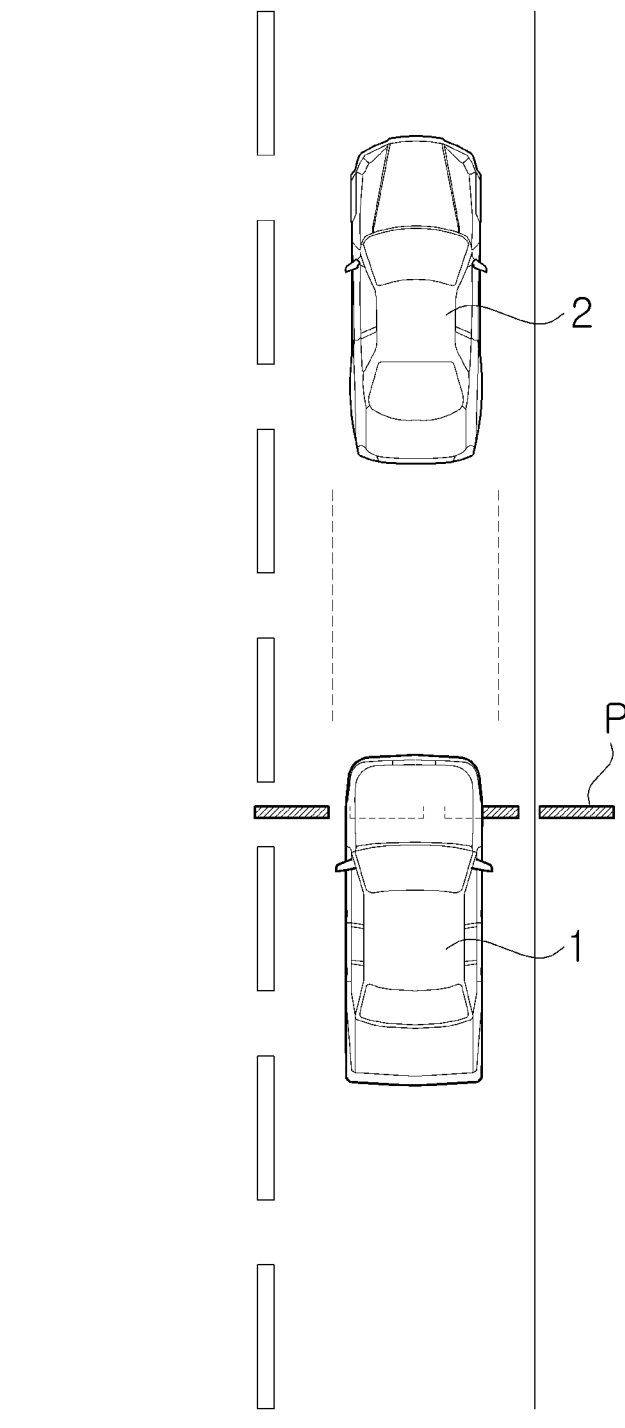
FIG. 5 illustrates that vehicle pushing occurs during braking.
Figure 6:
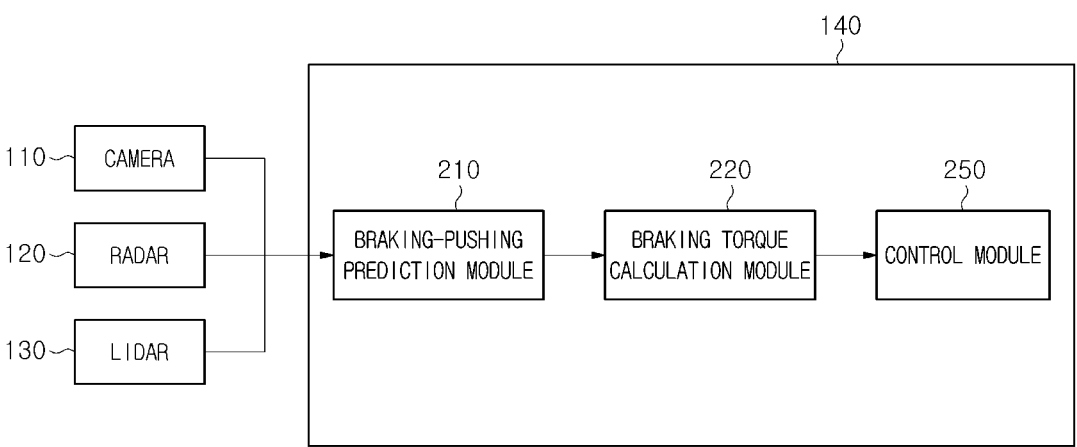
FIG. 6 illustrates function modules of a controller included in the driver assistance apparatus in accordance with one embodiment.

FIG. 3 is a graph showing that vehicle pushing occurs due to a decrease in braking torque. FIG. 4 illustrates a position where a vehicle is predicted to be positioned during braking for deceleration of a vehicle. FIG. 5 illustrates that vehicle pushing occurs during braking. FIG. 6 illustrates function modules of a controller included in the driver assistance apparatus in accordance with one embodiment.

Figure 7:
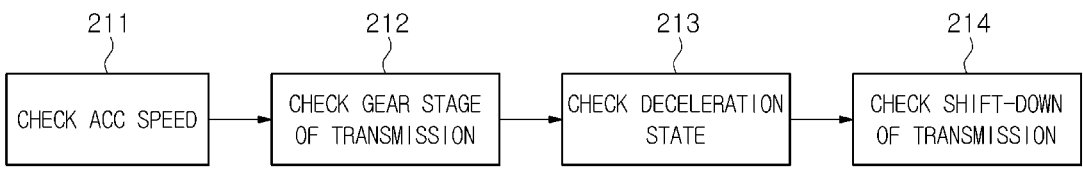
FIG. 7 is a diagram in which a braking-pushing prediction module illustrated in FIG. 6 is embodied.
Figure 8:
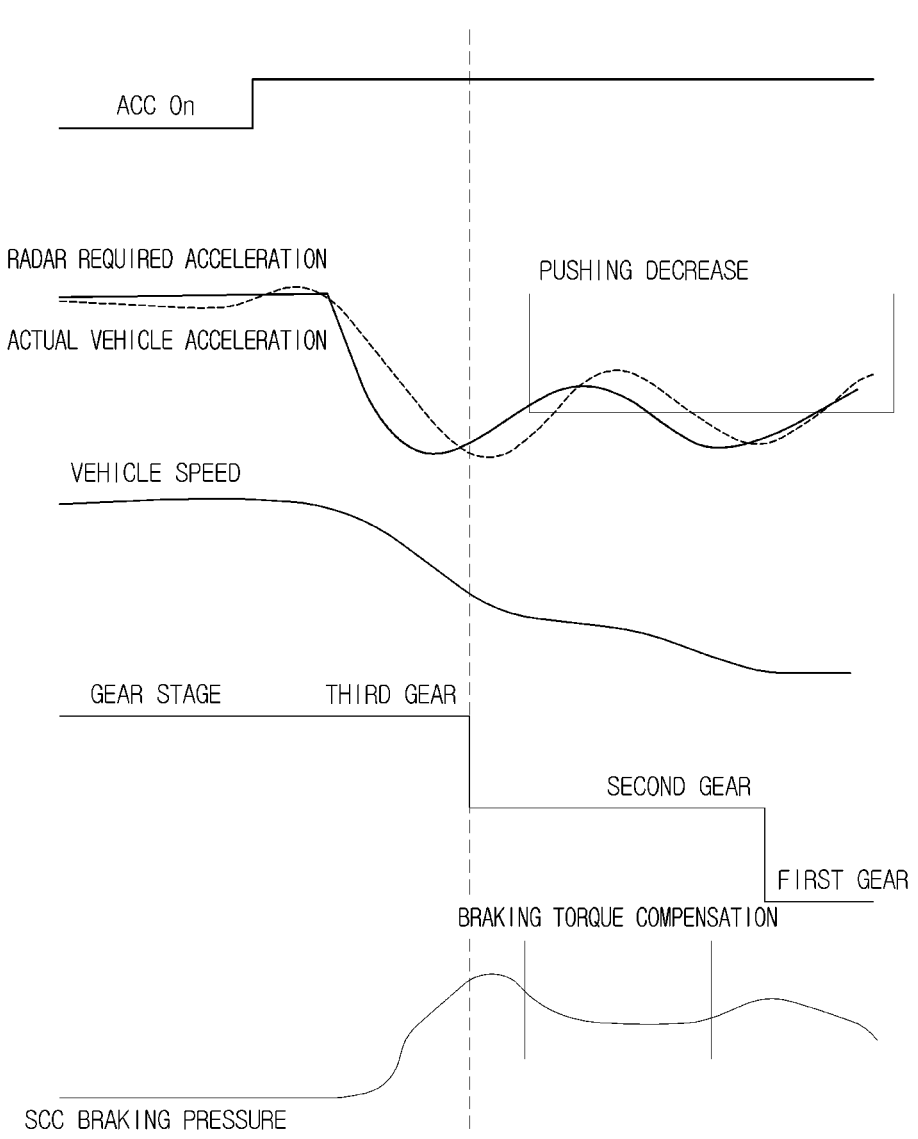
FIG. 8 is a graph showing that vehicle pushing is reduced when compensating for braking torque.

FIG. 7 is a diagram in which a braking-pushing prediction module illustrated in FIG. 6 is embodied. FIG. 8 is a graph showing that vehicle pushing is reduced when compensating for braking torque.

The driver assistance apparatus 100 provides an ACC function as described above. When a driver drives in a city using ACC, the vehicle may repeatedly accelerate and decelerate at a low speed due to traffic congestion or the like. In this case, the controller 140 may calculate a required acceleration for controlling a distance to a target vehicle by processing the data obtained from the aforementioned front sensor, and transmit the required acceleration to a device for performing functions related to the ACC. Since a situation of the vehicle corresponds to a situation in which acceleration is required when the required acceleration is a positive value, the driver assistance apparatus 100 performs control for increasing speed. Since the situation of the vehicle corresponds to a situation in which deceleration is required when the required acceleration is a negative value, the driver assistance apparatus 100 calculates a braking torque for reducing the speed of the vehicle and reduces the speed of the vehicle according to the calculated braking torque.

Referring to FIG. 3, since the vehicle is in the situation in which deceleration is required when the required acceleration obtained by processing the data of the front sensor becomes a negative value in a state where the ACC is activated, the driver assistance apparatus 100 brakes the vehicle by calculating the braking torque based on the required acceleration. At this time, when shift-down of shifting a gear stage of the transmission to a lower gear stage occurs, the braking torque decreases, and as a result, a phenomenon in which the acceleration of the vehicle does not follow the required acceleration occurs. In this case, a phenomenon in which the vehicle is pushed during braking occurs.

That is, when the shift-down of the transmission does not occur, the vehicle is not positioned at an expected position P (see FIG. 4) during braking, and the vehicle may be pushed and thus positioned at a more advanced position than the expected position as illustrated in FIG. 5.

When a braking distance becomes longer due to the vehicle pushing, the driver's anxiety may increase and the confidence in the ACC function may decrease. The driver assistance apparatus 100 in accordance with the disclosed embodiment may suppress this braking pushing by compensating for braking torque. Hereinafter, this will be described in detail.

The controller 140 may functionally include a plurality of modules. Each of the modules may be a hardware module (e.g., an ASIC or FPGA) included in the processor 141 or a software module (e.g., an application program or data) stored in the memory 142.

As illustrated in FIG. 6, the controller 140 may include a braking-pushing prediction module (hereinafter referred to as a pushing prediction module for convenience of description) 210, a braking torque calculation module 220, and a control module 250.

The pushing prediction module 210 of the controller 140 checks a driving speed of the vehicle in a state where the ACC function is activated (211). The pushing prediction module 210 may determine whether the driving speed of the vehicle is equal to or less than a predetermined speed by checking the driving speed of the vehicle. As described above, during driving in a city, where there are many surrounding vehicles that are traveling and thus a distance between vehicles is not wide and acceleration and deceleration are repeated, it is dangerous when pushing occurs. Accordingly, when the speed corresponds to a predetermined specific speed that may reflect urban driving or less, the controller 140 may perform control for preventing the braking-pushing. When the driving speed of the vehicle does not correspond to the predetermined speed or less, driving control according to the operating ACC may be maintained.

The pushing prediction module 210 checks whether the gear stage of the transmission is a predetermined gear stage or lower when the driving speed of the vehicle is equal to or less than the predetermined speed in the state where the ACC function is activated (212). When the gear stage of the transmission of the vehicle is a gear stage generally applicable during urban driving (e.g., third gear, but is not limited thereto) or lower, the controller 140 may perform control for preventing braking-pushing. When the gear stage of the transmission of the vehicle does not correspond to the predetermined gear stage or lower, driving control according to the operating ACC may be maintained.

The pushing prediction module 210 checks whether the vehicle is in a situation in which deceleration is required when the driving speed of the vehicle is equal to or less than the predetermined speed in the state where the ACC function is activated and the gear stage of the transmission is the predetermined gear stage or lower (213). The pushing prediction module 210 may determine whether the vehicle is in the situation in which deceleration is required by processing data obtained from the front sensor, calculating a distance to a preceding vehicle, and checking whether the required acceleration of the vehicle has a negative value based on the calculated distance. When the situation of the vehicle corresponds to the situation in which deceleration is required, the controller 140 may perform control for preventing braking-pushing. When the vehicle is not in the situation in which deceleration is required, driving control according to the operating ACC may be maintained.

The pushing prediction module 210 checks whether shift-down of the transmission has occurred when the driving speed of the vehicle is equal to or less than the predetermined speed in the state where the ACC function is activated, the gear stage of the transmission is the predetermined gear stage or lower, and the vehicle is in the situation in which deceleration is required (214). As described above, when the shift-down of the transmission occurs during deceleration, vehicle pushing may occur during braking, and accordingly, when the shift-down of the transmission occurs, the controller 140 may perform control for preventing braking-pushing. When the vehicle is not in the situation in which deceleration is required, driving control according to the operating ACC may be maintained.

As described above, the pushing prediction module 210 may determine that vehicle pushing is predicted during braking of the vehicle when the driving speed of the vehicle is equal to or less than the predetermined speed in the state where the ACC is activated, the gear stage of the transmission is the predetermined gear stage or lower, the vehicle is in the situation in which deceleration is required, and the shift-down of the transmission has occurred.

When the pushing prediction module 210 determines that the vehicle pushing is predicted during braking for vehicle deceleration, the braking torque calculation module 220 may calculate a final target braking torque that compensates for the braking torque that is decreased due to the shift-down of the transmission. The final target braking torque may be calculated according to Equation 1 below.

$$T_{Brake\_final} = T_{brake\_original} + (A_{X\_gear\_shift} \times M \times R) \qquad \text{[Equation 1]}$$

where, $T_{Brake\_final}$=final target braking torque, $T_{brake\_original}$=existing target braking torque, $A_{X\_gear\_shift}$=amount of change in acceleration due to gear pushing, M=vehicle weight, and R=dynamic radius.

When the braking torque calculation module 220 calculates the final target braking torque according to Equation 1 described above, the control module 250 may control the braking apparatus 30 according to the final target braking torque to prevent the vehicle pushing due to the decrease in braking torque as shown in FIG. 8.

Figure 9:
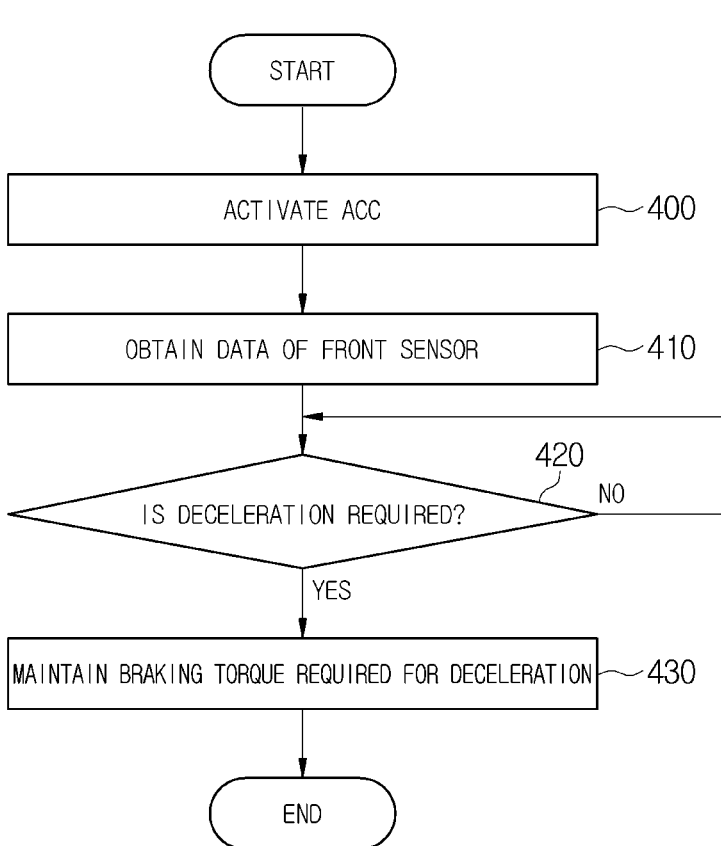
FIGS. 9 to 11 illustrate operations of the driver assistance apparatus in accordance with one embodiment.
Figure 10:
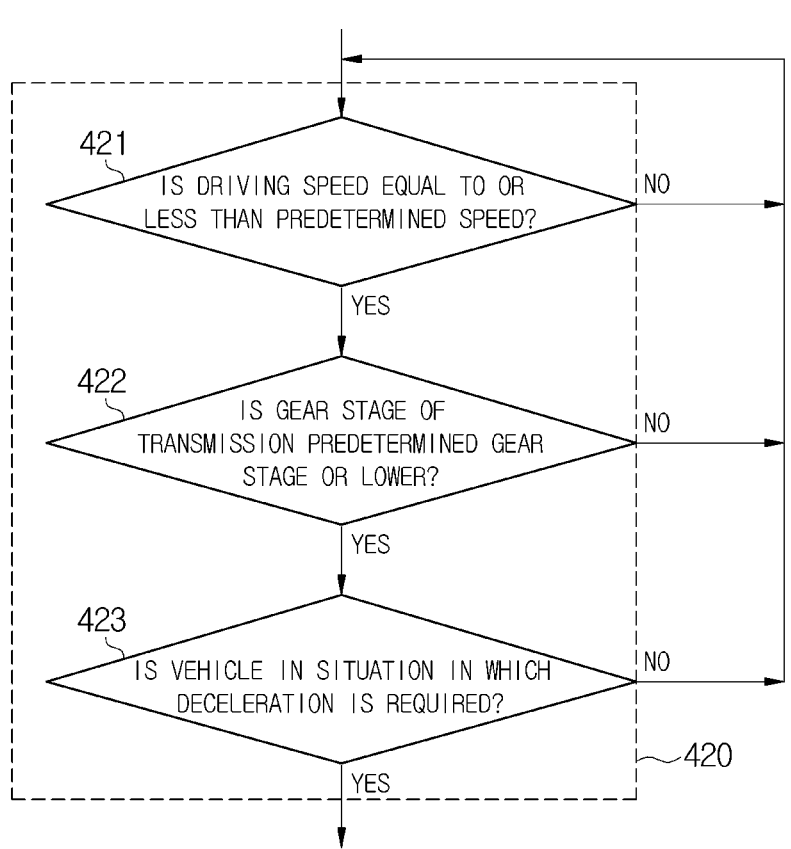
Figure 11:
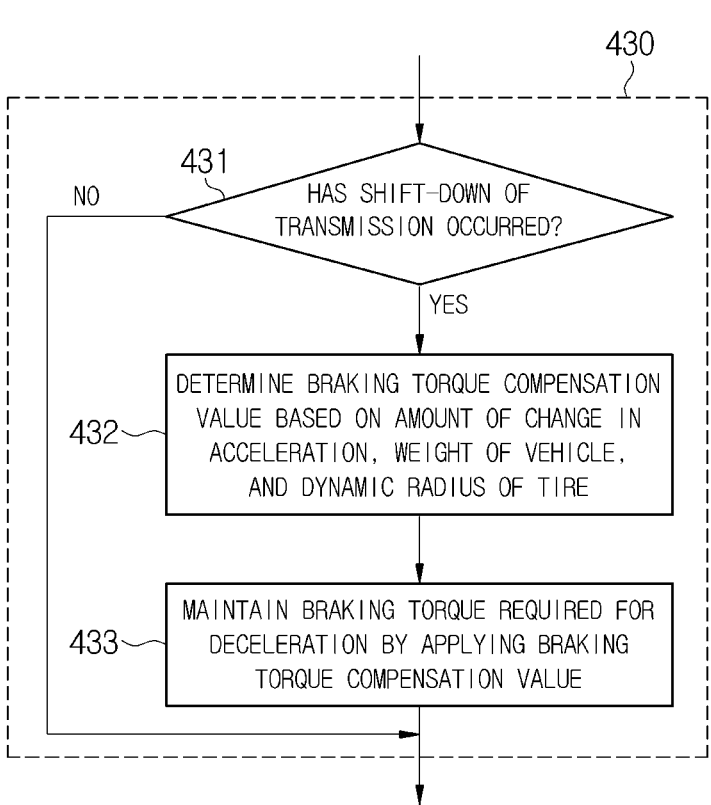

FIGS. 9 to 11 illustrate operations of a driver assistance apparatus in accordance with one embodiment.

Referring to FIG. 9, the controller 140 obtains data of the front sensor in a state where the ACC is activated (400) (410), and determines whether the vehicle is in a situation in which deceleration is required in response to processing the obtained data (420). Referring to FIG. 10 in which operation 420 is embodied, the controller 140 determines whether the vehicle is in the situation in which deceleration is required (423) when a driving speed of the vehicle is equal to or less than a predetermined speed (421) and the gear stage of the transmission is a predetermined gear stage or lower (422).

The controller 140 checks the driving speed of the vehicle in a state where the ACC function is activated. The controller 140 may determine whether the driving speed of the vehicle is equal to or less than the predetermined speed by checking the driving speed of the vehicle. As described above, during driving in a city, where there are many surrounding vehicles that are traveling and thus a distance between vehicles is not wide and acceleration and deceleration are repeated, it is dangerous when pushing occurs. Accordingly, when the speed corresponds to a predetermined specific speed that may reflect urban driving or less, the controller 140 may perform control for preventing braking-pushing. When the driving speed of the vehicle does not correspond to the predetermined speed or less, driving control according to the operating ACC may be maintained.

The controller 140 checks whether the gear stage of the transmission is a predetermined gear stage or lower when the driving speed of the vehicle is equal to or less than the predetermined speed in the state where the ACC function is activated. When the gear stage of the transmission of the vehicle is a gear stage generally applicable during urban driving (e.g., third gear, but is not limited thereto) or lower, the controller 140 may perform control for preventing the braking-pushing. When the gear stage of the transmission of the vehicle does not correspond to the predetermined gear stage or lower, driving control according to the operating ACC may be maintained.

The controller 140 checks whether the vehicle is in the situation in which deceleration is required when the driving speed of the vehicle is equal to or less than the predetermined speed in the state where the ACC function is activated and the gear stage of the transmission is the predetermined gear stage or lower. The controller 140 may determine whether the vehicle is in the situation in which deceleration is required by processing data obtained from the front sensor, calculating a distance to a preceding vehicle, and checking whether the required acceleration of the vehicle has a negative value based on the calculated distance. When the situation of the vehicle corresponds to the situation in which the deceleration is required, the controller 140 may perform control for preventing the braking-pushing. When the vehicle is not in the situation in which the deceleration is required, driving control according to the operating ACC may be maintained.

The controller 140 may maintain a braking torque required for the deceleration when the vehicle is in the situation in which the deceleration is required (430). Referring to FIG. 11 in which operation 430 is embodied, the controller 140 may determine a braking torque compensation value based on the amount of change in acceleration, a weight of the vehicle, and a dynamic radius of a tire (432) when shift-down of the transmission occurs (431), and maintain the braking torque required for deceleration by controlling the braking apparatus 30 according to a final target braking torque to which the braking torque compensation value is applied (433).

The controller 140 checks whether the shift-down of the transmission has occurred when the driving speed of the vehicle is equal to or less than the predetermined speed in the state where the ACC function is activated, the gear stage of the transmission is the predetermined gear stage or lower, and the vehicle is in the situation in which the deceleration is required. As described above, when the shift-down of the transmission occurs during deceleration, vehicle pushing may occur during braking, and accordingly, when the shift-down of the transmission occurs, the controller 140 may perform control for preventing braking-pushing. When the vehicle is not in the situation in which the deceleration is required, driving control according to the operating ACC may be maintained.

The controller 140 may determine that vehicle pushing is predicted during braking of the vehicle when the driving speed of the vehicle is equal to or less than the predetermined speed in the state where the ACC is activated, the gear stage of the transmission is the predetermined gear stage or lower, the vehicle is in the situation in which deceleration is required, and the shift-down of the transmission has occurred, as described above.

When it is determined that the vehicle pushing is predicted during braking for vehicle deceleration, the controller 140 may calculate the final target braking torque that compensates for the braking torque that is decreased due to the shift-down of the transmission. The final target braking torque may be calculated according to Equation 1 described above.

When the final target braking torque is calculated according to Equation 1 described above, the controller 140 may control the braking apparatus 30 according to the final target braking torque to prevent the vehicle pushing due to the decrease in braking torque as shown in FIG. 8.

Hereinafter, specific operations of the driver assistance apparatus 100 in accordance with another embodiment will be described in more detail.

Figure 12:
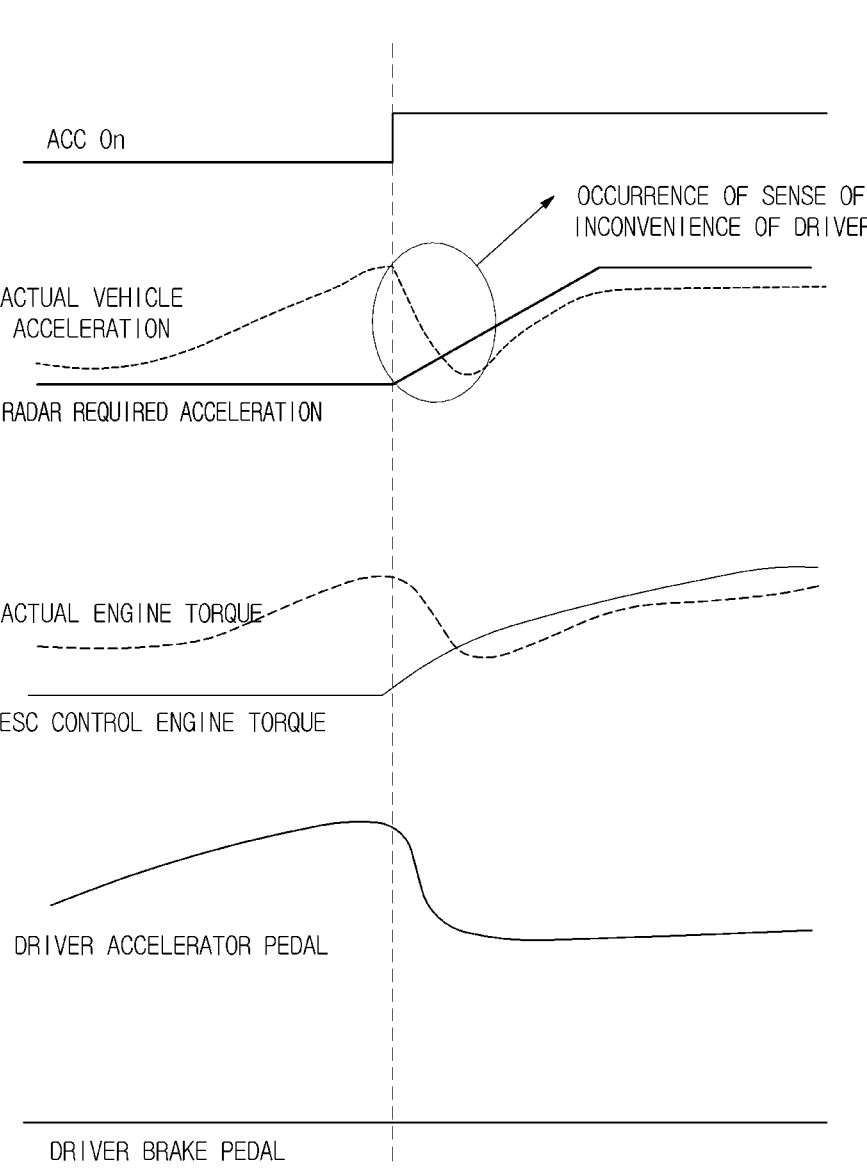
FIG. 12 is a graph showing that an acceleration shock is generated by vehicle acceleration when ACC is activated.
Figure 13:
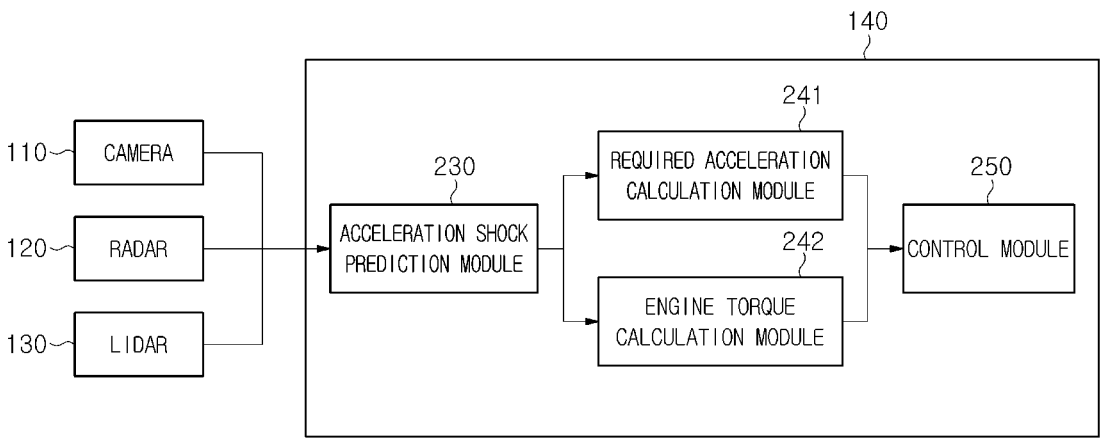
FIG. 13 illustrates function modules of a controller included in the driver assistance apparatus in accordance with one embodiment.
Figure 14:
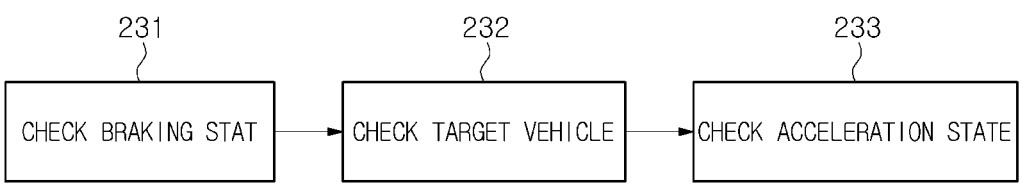
FIG. 14 is a diagram in which an acceleration shock prediction module illustrated in FIG. 13 is embodied.
Figure 15:
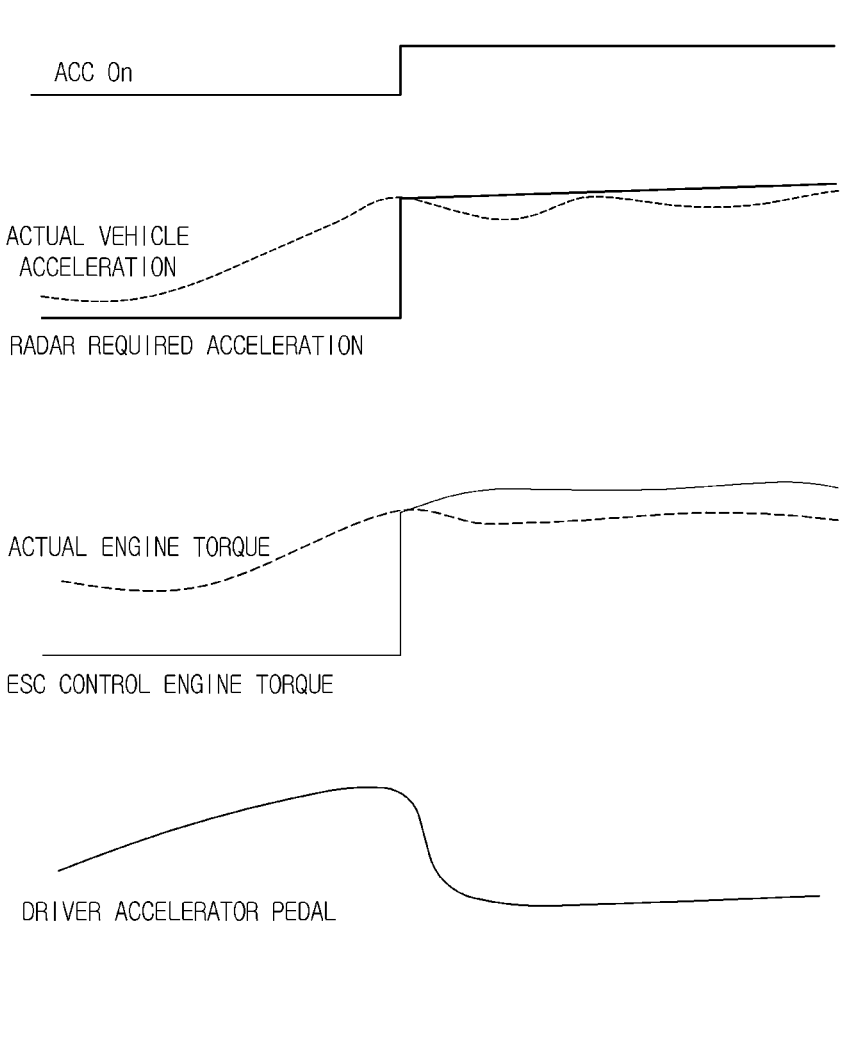
FIG. 15 is a graph showing that the acceleration shock is reduced when a target control value is set.

FIG. 12 is a graph showing that an acceleration shock is generated by vehicle acceleration when ACC is activated. FIG. 13 illustrates function modules of a controller included in the driver assistance apparatus in accordance with one embodiment. FIG. 14 is a diagram in which an acceleration shock prediction module illustrated in FIG. 13 is embodied. FIG. 15 is a graph showing that the acceleration shock is reduced when a target control value is set.

The driver assistance apparatus 100 provides the ACC function as described above. When a driver drives in a city using ACC, the vehicle may repeatedly accelerate and decelerate at a low speed due to traffic congestion or the like. In this case, the controller 140 may calculate a required acceleration for controlling a distance to a target vehicle by processing the data obtained from the aforementioned front sensor, and transmit the required acceleration to a device for performing functions related to the ACC. Since a situation of the vehicle corresponds to a situation in which acceleration is required when the required acceleration is a positive value, the driver assistance apparatus 100 performs control for increasing speed. Since the situation of the vehicle corresponds to a situation in which deceleration is required when the required acceleration is a negative value, the driver assistance apparatus 100 calculates a braking torque for reducing the speed of the vehicle and reduces the speed of the vehicle according to the calculated braking torque.

Referring to FIG. 12, the vehicle accelerates when the driver steps on an accelerator pedal with an intention of accelerating. At this time, when the ACC is activated, the controller 140 calculates the required acceleration by processing the data obtained from the front sensor such as the aforementioned radar or the like, and controls the vehicle according to the required acceleration.

Therefore, since a difference between the vehicle acceleration by the accelerator pedal immediately before the ACC is activated and the required acceleration occurs, the vehicle acceleration rapidly decreases, and thus the driver feels a sense of difference and an acceleration shock occurs in the vehicle.

The acceleration shock causes the driver and passengers to feel the sense of difference, which degrades a ride comfort, and sometimes causes a risk of vehicle collision due to excessive acceleration and deceleration driving.

The driver assistance apparatus 100 in accordance with the disclosed embodiment may reduce the acceleration shock by setting a target control value. Hereinafter, this will be described in detail.

The controller 140 may functionally include a plurality of modules. Each of the modules may be a hardware module (e.g., an ASIC or FPGA) included in the processor 141 or a software module (e.g., an application program or data) stored in the memory 142.

As illustrated in FIG. 13, the controller 140 may include an acceleration shock prediction module (hereinafter referred to as a shock prediction module for convenience of description) 230, a required acceleration calculation module 241, an engine torque calculation module 242, and a control module 250.

The shock prediction module 230 of the controller 140 checks a braking state of the vehicle when the ACC function is activated (231). The shock prediction module 230 may determine whether braking of the vehicle is being performed by checking the braking state of the vehicle. When braking of the vehicle is being performed, an acceleration shock due to the driver's operation of the accelerator pedal is not generated. Accordingly, when braking of the vehicle is not being performed, the controller 140 may perform control for preventing an acceleration shock. When braking of the vehicle is being performed, driving control according to the operating ACC may be maintained or the ACC may be terminated.

When the vehicle is not in a braking situation when the ACC function is activated, the shock prediction module 230 checks whether a target vehicle driving in front of the vehicle exists (232). When no target vehicle driving in front of the vehicle exists, the controller 140 may perform control for preventing the acceleration shock. When the target vehicle driving in front of the vehicle exists, driving control according to the operating ACC may be maintained.

The shock prediction module 230 checks an acceleration state of the vehicle when the vehicle is not in the braking situation when the ACC function is activated and no target vehicle driving in front of the vehicle exists (233). The shock prediction module 230 may determine whether the vehicle is in a situation in which acceleration is required by checking whether the acceleration of the vehicle immediately before activation of the ACC is the same as a required acceleration of the ACC. When the situation of the vehicle corresponds to the situation in which acceleration is required, the controller 140 may perform control for preventing the acceleration shock. When the vehicle is not in the situation in which acceleration is required, driving control according to the operating ACC may be maintained.

As described above, the shock prediction module 230 may determine that an acceleration shock of the vehicle is predicted when the vehicle is not in the braking situation when the ACC is activated, no target vehicle driving in front of the vehicle exists, and the vehicle is in the situation in which acceleration is required.

When the shock prediction module 230 determines that the acceleration shock of the vehicle is predicted, the required acceleration calculation module 241 or the engine torque calculation module 242 may calculate a target control value capable of minimizing the acceleration shock.

The required acceleration calculation module 241 may calculate the required acceleration as the target control value. Meanwhile, the engine torque calculation module 242 may calculate a required engine torque as the target control value.

The required acceleration calculation module 241 may grasp the acceleration of the vehicle immediately before activation of the ACC and set the required acceleration to be the same as the acceleration of the vehicle immediately before the activation of the ACC.

The engine torque calculation module 242 may grasp an engine torque of the vehicle immediately before activation of the ACC and set a required engine torque to be the same as the engine torque of the vehicle immediately before the activation of the ACC.

When the target control value is calculated in the required acceleration calculation module 241 or the engine torque calculation module 242, the control module 250 may prevent the acceleration shock as illustrated in FIG. 6 by controlling the driving apparatus 20 according to the target control value.

In one embodiment, the controller 140 may include only one of the required acceleration calculation module 241 and the engine torque calculation module 242.

When the controller 140 includes only the required acceleration calculation module 241, the control module 250 may prevent the acceleration shock by controlling the driving apparatus 20 according to the required acceleration calculated by the required acceleration calculation module 241.

When the controller 140 includes only the engine torque calculation module 242, the control module 250 may prevent the acceleration shock by controlling the driving apparatus 20 according to the required acceleration calculated by the required acceleration calculation module 241.

FIGS. 16 to 19 illustrate operations of a driver assistance apparatus in accordance with one embodiment.

Figure 16:
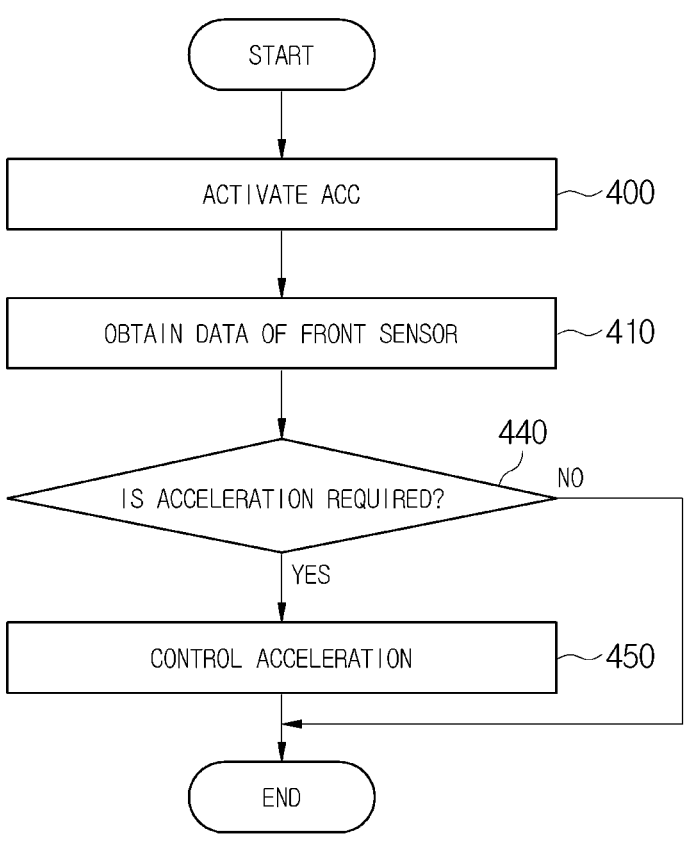
FIGS. 16 to 19 illustrate operations of the driver assistance apparatus in accordance with one embodiment.
Figure 17:
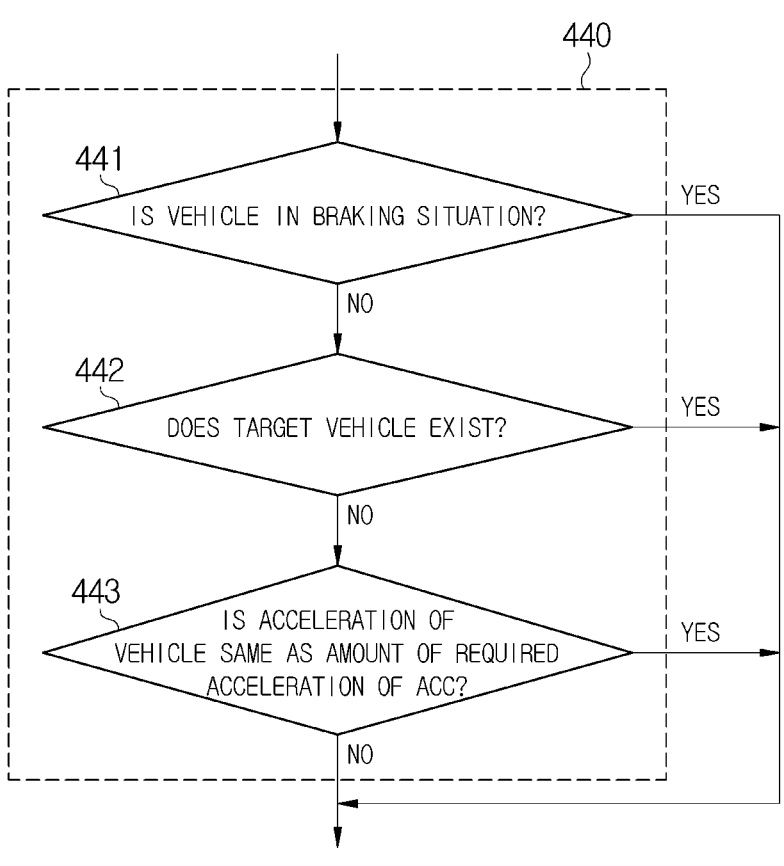

Referring to FIG. 16, the controller 140 obtains data of the front sensor when the ACC is activated (400) (410), and determines whether the vehicle is in a situation in which acceleration is required in response to processing the obtained data (440). Referring to FIG. 17 in which operation 440 is embodied, the controller 140 determines whether the vehicle is in the situation in which acceleration is required (443) when the vehicle is not in a braking situation (441) and no target vehicle driving in front of the vehicle exists (442).

The controller 140 checks a braking state of the vehicle when the ACC function is activated. The controller 140 may determine whether braking of the vehicle is being performed by checking the braking state of the vehicle. When braking of the vehicle is being performed, an acceleration shock due to the driver's operation of the accelerator pedal is not generated. Accordingly, when braking of the vehicle is not being performed, the controller 140 may perform control for preventing the acceleration shock. When braking of the vehicle is being performed, driving control according to the operating ACC may be maintained or the ACC may be terminated.

When the vehicle is not in a braking situation when the ACC function is activated, the controller 140 checks whether a target vehicle driving in front of the vehicle exists. When no target vehicle driving in front of the vehicle exists, the controller 140 may perform control for preventing the acceleration shock. When the target vehicle driving in front of the vehicle exists, driving control according to the operating ACC may be maintained.

The controller 140 checks an acceleration state of the vehicle when the vehicle is not in the braking situation when the ACC function is activated and no target vehicle driving in front of the vehicle exists. The controller 140 may determine whether the vehicle is in the situation in which acceleration is required by checking whether the acceleration of the vehicle immediately before activation of the ACC is the same as a required acceleration of the ACC. When the situation of the vehicle corresponds to the situation in which acceleration is required, the controller 140 may perform control for preventing the acceleration shock. When the vehicle is not in the situation in which acceleration is required, driving control according to the operating ACC may be maintained.

The controller 140 may set a target control value required for acceleration and control the acceleration according to the target control value when the vehicle is in the situation in which acceleration is required (450).

Figure 18:
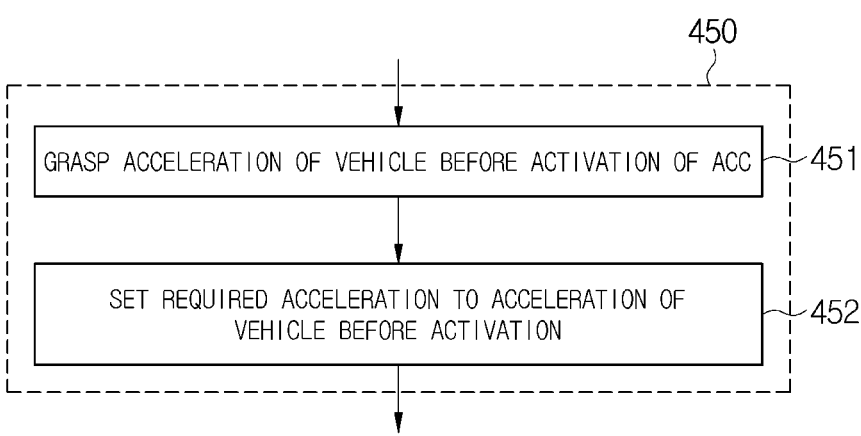

Referring to FIG. 18 in which operation 450 is embodied, the controller 140 may grasp the acceleration of the vehicle immediately before activation of the ACC (451), and set the required acceleration of the ACC to be the same as the acceleration of the vehicle immediately before the activation of the ACC (452).

The controller 140 grasps the acceleration of the vehicle immediately before activation of the ACC when the vehicle is not in a braking situation when the ACC function is activated, no target vehicle driving in front of the vehicle exists, and the vehicle is in the situation in which acceleration is required. Since the acceleration shock may occur when there is a difference between the acceleration of the vehicle immediately before activation of the ACC and the required acceleration of the ACC, the controller 140 may perform control for preventing the acceleration shock. When the vehicle is not in the situation in which acceleration is required, the controller may maintain driving control according to the operating ACC.

The controller 140 may grasp the acceleration of the vehicle immediately before activation of the ACC when it is determined that acceleration of the vehicle is required, and set the required acceleration to be the same as the acceleration of the vehicle immediately before the activation of the ACC. The controller may prevent the acceleration shock as illustrated in FIG. 15 by controlling the driving apparatus 20 according to the set required acceleration.

Figure 19:
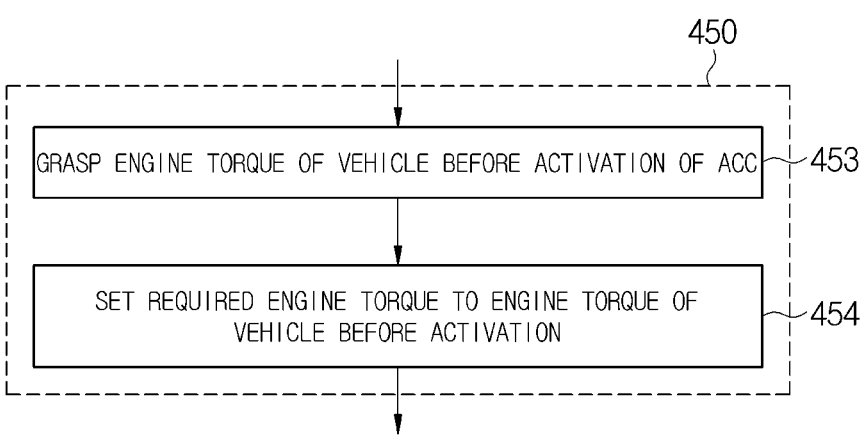

Meanwhile, referring to FIG. 19 in which operation 450 is embodied in accordance with another embodiment, the controller 140 may grasp an engine torque of the vehicle immediately before activation of the ACC (453), and set a required engine torque of the ACC to be the same as the engine torque of the vehicle immediately before the activation of the ACC (454).

The controller 140 grasps the acceleration of the vehicle immediately before activation of the ACC when the vehicle is not in a braking situation when the ACC function is activated, no target vehicle driving in front of the vehicle exists, and the vehicle is in the situation in which acceleration is required. Since the acceleration shock may occur when there is a difference between the acceleration of the vehicle immediately before activation of the ACC and the required acceleration of the ACC, the controller 140 may perform control for preventing the acceleration shock. When the vehicle is not in the situation in which acceleration is required, the controller may maintain driving control according to the operating ACC.

The controller 140 may grasp the engine torque of the vehicle immediately before activation of the ACC when it is determined that acceleration of the vehicle is required, and set the required acceleration to be the same as the engine torque of the vehicle immediately before the activation of the ACC. The controller may prevent the acceleration shock as illustrated in FIG. 15 by controlling the driving apparatus 20 according to the set required engine torque.

Meanwhile, the disclosed embodiments may be implemented in the form of a recording medium storing instructions executable by a computer. Instructions may be stored in the form of program codes, and when executed by a processor, may create program modules to perform operations of the disclosed embodiments. The recording medium may be implemented as a computer-readable recording medium.

The computer-readable recording medium includes all types of recording media in which instructions capable of being decoded by a computer are stored. For example, there may be a read only memory (ROM), a random access memory (RAM), a magnetic tape, a magnetic disk, a flash memory, an optical data storage device, and the like.

A machine-readable storage medium may be provided in the form of a non-transitory storage medium. Here, the term "non-transitory storage medium" simply means that the storage medium is a tangible device, and does not include a signal (e.g., an electromagnetic wave), but this term does not differentiate between a case where data is semi-permanently stored in the storage medium and a case where the data is temporarily stored in the storage medium. For example, the "non-transitory storage medium" may include a buffer in which data is temporarily stored.

As is apparent from the above description, in accordance with one aspect of the present disclosure, it is possible to prevent a vehicle from being pushed during braking even when shift-down of a transmission occurs during deceleration in a state where ACC is activated.

In accordance with one aspect of the present disclosure, it is possible to prevent an acceleration shock from occurring due to a sudden change in acceleration of a vehicle when ACC is activated.

As above, the disclosed embodiments have been described with reference to the accompanying drawings. It will be understood by those skilled in the art that various changes in form and details may be made therein without departing from the spirit and scope of the disclosure as defined by the appended claims and their equivalents. The disclosed embodiments are illustrative and should not be construed as limiting.

What is claimed is:

1. A driver assistance apparatus comprising:
   a front sensor installed in a vehicle and having a field of sensing in front of the vehicle; and
   a controller configured to process data obtained by the front sensor,
   wherein the controller is configured to:
      determine whether the vehicle is in a situation in which deceleration is required in response to the processing of the data of the front sensor when adaptive cruise control (ACC) is in an activated state;
      maintain a braking torque required for the deceleration so that the vehicle is not pushed during braking when the vehicle is in the situation in which the deceleration is required; and
      compensate for a decrease in the braking torque so that the braking torque is maintained when shift-down of a transmission of the vehicle occurs in the situation in which the deceleration is required by determining an amount of change in acceleration by the shift-down of the transmission and by determining a compensation value of the braking torque based on the determined amount of change in acceleration.

2. The driver assistance apparatus according to claim 1, wherein the controller is configured to determine whether a gear stage of the transmission of the vehicle is a predetermined gear stage or lower when the ACC is in the activated state.

3. The driver assistance apparatus according to claim 2, wherein the controller is configured to check whether the shift-down of the transmission has occurred when the gear stage of the transmission is the predetermined gear stage or lower.

4. The driver assistance apparatus according to claim 2, wherein the controller is configured to determine whether the gear stage of the transmission of the vehicle is the predetermined gear stage or lower when a driving speed of the vehicle is a predetermined speed or lower in the state where the ACC is activated.

5. The driver assistance apparatus according to claim 1, wherein the controller is configured to:
      determine the amount of change in acceleration by the shift-down of the transmission; and determine the compensation value of the braking torque based on the determined amount of change in acceleration, a weight of the vehicle, and a dynamic radius of a tire.

6. The driver assistance apparatus according to claim 1, wherein the controller is configured to:

determine the amount of change in acceleration by the shift-down of the transmission; and determine the compensation value of the braking torque in proportion to the determined amount of change in acceleration, a weight of the vehicle, and a dynamic radius of a tire.

7. A driver assistance method comprising:

obtaining data through a front sensor having a field of sensing in front of a vehicle;

processing the data obtained from the front sensor;

determining whether the vehicle is in a situation in which deceleration is required in response to the processing of the data of the front sensor when adaptive cruise control (ACC) is in an activated state; and maintaining a braking torque required for the deceleration so that the vehicle is not pushed during braking when the vehicle is in the situation in which deceleration is required, wherein the maintaining of the braking torque includes compensating for a decrease in the braking torque so that the braking torque is maintained when shift-down of a transmission of the vehicle occurs in the situation in which the deceleration is required, and wherein the compensating of the decrease in the braking torque includes:

determining an amount of change in acceleration by the shift-down of the transmission; and determining a compensation value of the braking torque based on the determined amount of change in acceleration.

8. The driver assistance method according to claim 7, further comprising:

determining whether a gear stage of the transmission of the vehicle is a predetermined gear stage or lower when the ACC is in the activated state; and checking whether shift-down of the transmission has occurred when the gear stage of the transmission is the predetermined gear stage or lower.

9. The driver assistance method according to claim 8, wherein the determining of whether the gear stage of the transmission of the vehicle is the predetermined gear stage or lower includes determining whether the gear stage of the transmission of the vehicle is the predetermined gear stage or lower when a driving speed of the vehicle is a predetermined speed or lower in the state where the ACC is activated.

10. The driver assistance method according to claim 7, wherein the compensating of the decrease in the braking torque includes:

determining the amount of change in acceleration by the shift-down of the transmission; and determining the compensation value of the braking torque based on the determined amount of change in acceleration, a weight of the vehicle, and a dynamic radius of a tire.

11. The driver assistance method according to claim 7, wherein the compensating of the decrease in the braking torque includes:

determining the amount of change in acceleration by the shift-down of the transmission; and determining the compensation value of the braking torque in proportion to the determined amount of change in acceleration, a weight of the vehicle, and a dynamic radius of a tire.

12. A driver assistance apparatus comprising:

a front sensor installed in a vehicle and having a field of sensing in front of the vehicle; and a controller configured to process data obtained by the front sensor, wherein the controller is configured to:

determine whether the vehicle is in a situation in which deceleration is required in response to the processing of the data of the front sensor when adaptive cruise control (ACC) is in an activated state;

maintain an actual braking torque required for the deceleration so that the vehicle is not pushed during braking when the vehicle is in the situation in which the deceleration is required; and compensate a target braking torque for a decrease in the actual braking torque so that the actual braking torque is maintained when shift-down of a transmission of the vehicle occurs in the situation in which the deceleration is required.

* * * * *